Oct. 20, 1953

A. ALBARRANC 2,656,446

ELECTRIC RESISTANCE WELDING TOOL

Filed May 15, 1951

Inventor
Adrien Albarranc
By
Young, Emery & Thompson
Attys.

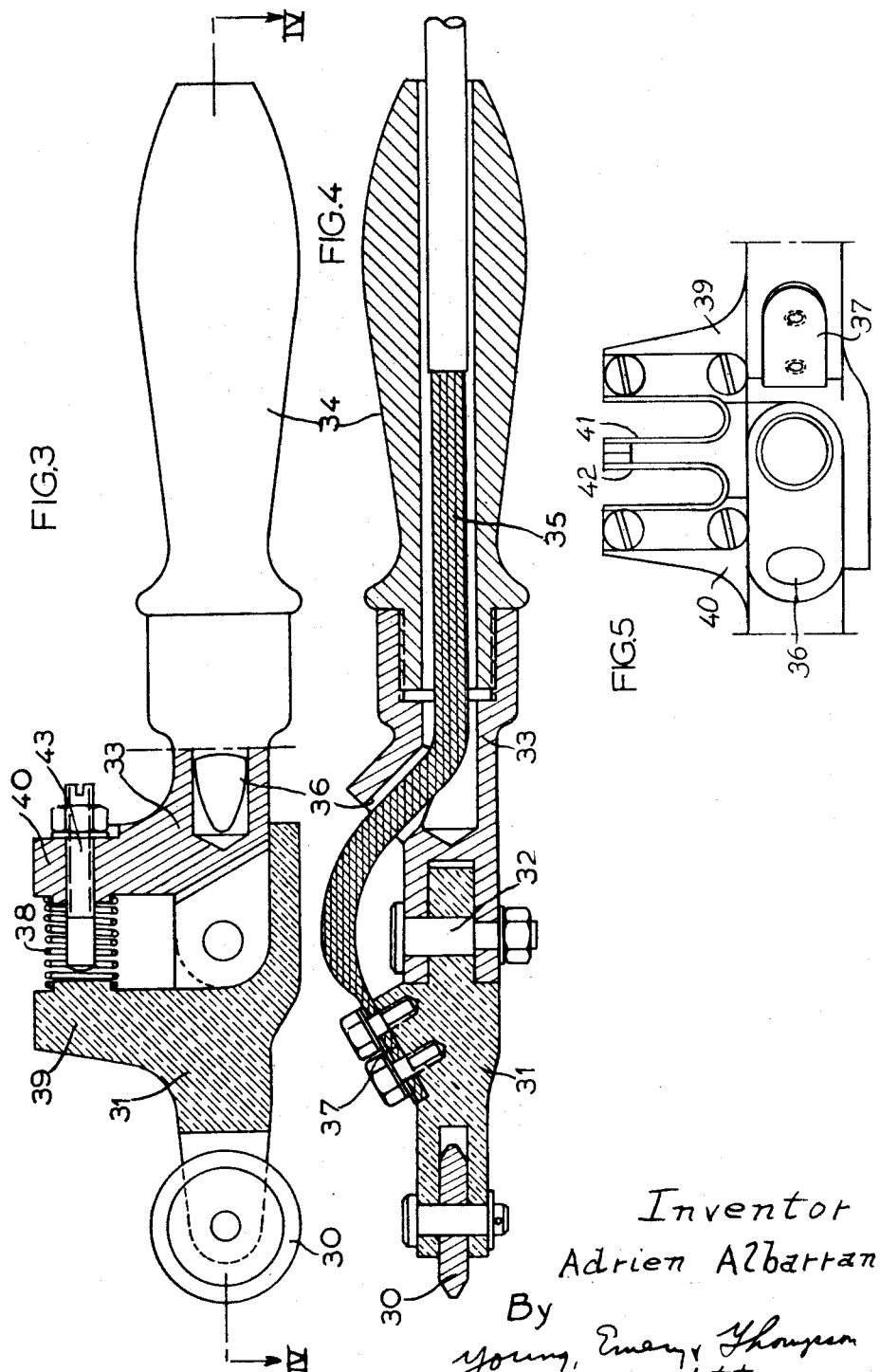

Patented Oct. 20, 1953

2,656,446

UNITED STATES PATENT OFFICE 2,656,446

ELECTRIC RESISTANCE WELDING TOOL

Adrien Albarranc, Paris, France

Application May 15, 1951, Serial No. 226,392
In France May 22, 1950

4 Claims. (Cl. 219—4)

1

The two chief drawbacks that are encountered when using electric resistance-welding instruments, consist in the arcing that may occur at the moment of the closing or of the opening of the welding circuit together with the high voltage applied to certain parts of the welding tool.

As concerns the arcing, the arc jumps whenever the energized electrode moves towards the part to be welded and away therefrom. This provides damage on the parts that are being welded and even, in the case of thin parts or of parts of a delicate structure, the arcs may pass through them and render them unfit for use.

This drawback may be avoided at the beginning and at the end of the welding by energizing the electrode only when it is laid over the part to be welded or by opening the circuit before moving said electrode away from said part. These steps require further handling and permanent attention. They are not sufficient for preventing the arcing that may occur when the electrode is fortuitously moved away from the part undergoing the welding procedure.

It has already been proposed to remove this drawback by closing the welding circuit by means of a contact piece carried by the actual welding tool and that is operative only when the tool is urged with a certain pressure against said member. One is led however to make and to break under such conditions comparatively intense currents in the actual body of the tool or else dangerous voltages arise in the latter when the breaking is performed through the primary of a welding transformer as is the case when alternating current is used.

My invention has for its object to remove such drawbacks.

A particular object of the invention consists in producing a resistance welding equipment adapted to be easily and reliably handled without any risk of arcing.

A further object consists in an arrangement providing for the welding of brittle and delicate parts.

A still further object consists in the possibility of reducing to values that may be as low as may be desired the intensities of the currents that are made and broken and also of the voltages appearing in the actual tool body.

Furthermore, I provide according to the invention for the execution of a welding tool of a strong and cheap structure that ensures in a completely reliable manner for the automatic control of the welding circuit.

Further features and objects of my invention

2 together with their advantages will appear in the reading of the following description and claims accompanying same, reference being made to appended drawings, wherein:

Fig. 3 is a side elevational view partly in section of a tool according to the invention.

Fig. 4 is a sectional view through line IV—IV of Fig. 3.

Fig. 5 is a partial elevational view of the side of said tool opposite that shown in Fig. 3.

Figure 1:
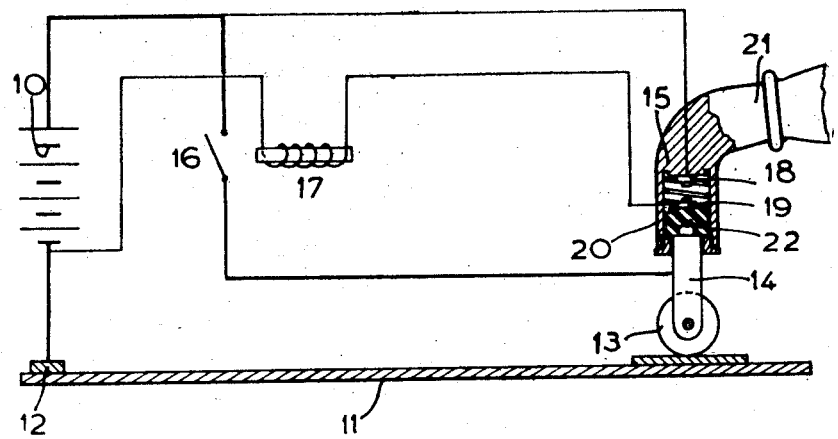
Fig. 1 is a diagrammatic view of a system according to the invention that is fed with direct current.

In the embodiment disclosed in Fig. 1, the welding circuit fed by a source of D. C. shown at 10 is closed over the part to be welded 11 on one hand through a permanent connection 12 and on the other through the small electrode wheel 13 and the electrode carrying rod 14 on the welding tool 15 under control of the switch 16 actuated by the electromagnet or the like relay 17. Said relay is fed by a shunt circuit established across a portion of the welding circuit fed by the battery or like source of D. C. 10, said shunt circuit passing through a switch constituted by the cooperating contact pieces 18—19 incorporated to the welding tool in a manner such that the closing of said contact pieces is performed when the tool is laid over the part to be welded and is urged against same with a predetermined pressure. The electrode-carrying rod 14 may be mounted for instance slidingly in a tubular part 20 of the handle 21 so as to be adapted to urge the lower contact piece 19 towards the upper contact piece 18 through the agency of an insulating washer 22 inserted between said lower contact pieces 19 and the sliding electrode carrying rod 14. It is apparent under such conditions that when the handle 21 carrying the electrode is not urged against the part to be welded, the switch 18—19 remains open. The relay 17 is then no longer fed and consequently the switch 16 remains open and the electrode is inoperative.

It is only when the small electrode wheel 13 is urged against the part to be welded under the action of a certain pressure exerted on the handle that the switch 18—19 closes which provides in its turn for the closing of the switch 16 and thereby of the welding circuit; conversely, when the pressure exerted on the tool is purposely or fortuitously released, the operative welding circuit is broken before the contact between the wheel 13 and the part to be welded ceases. This removes any risk of arcing.

Figure 2:
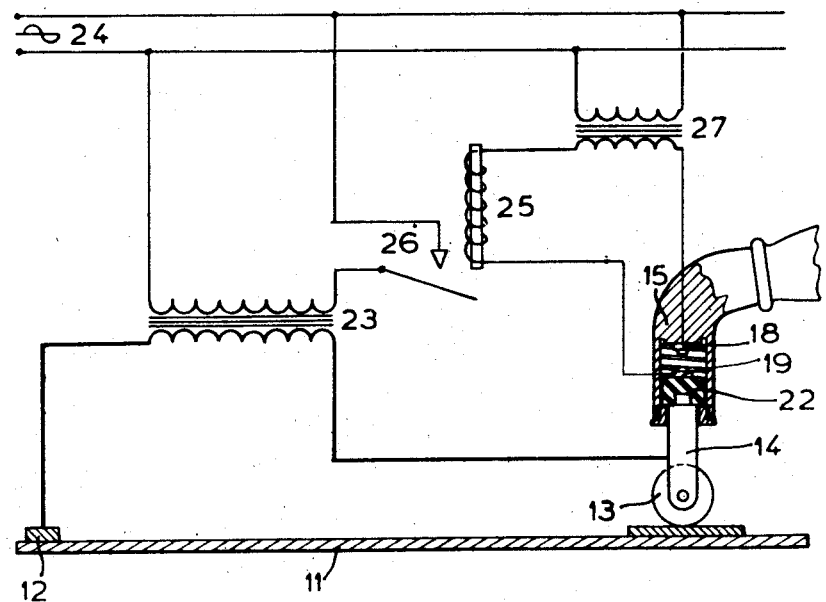
Fig. 2 is a diagrammatic view of a system according to my invention that is fed with alternating current.

Fig. 2 is a wiring diagram of the arrangement when adapted to the case of an A. C. feed. The welding circuit includes in this case the secondary of a welding transformer 23 that is permanently connected with the electrode-carrying rod 14.

The primary of the transformer is connected with the source of A. C. 24 through the agency of a switch 26 that closes when the winding 25 of its associated electromagnetic or the like relay is energized.

The circuit of said electromagnetic winding 25 includes the secondary of an auxiliary voltage-lowering transformer 27 and a switch constituted by the contact pieces 18—19 controlled by the application of the tool 15 against the part to be welded. As in the preceding case, when the contact pieces 18—19 are separated from one another in the case of the tool being inoperative, the winding 25 is no longer fed; the switch 26 opens consequently and no current is allowed to pass through the actual welding circuit fed by the transformer 23. It is only when the welding tool is applied with a certain pressure on the part to be welded that the electromagnetic relay is energized through the closing of the switch 18—19 which provides for the energization of the welding transformer 23.

In addition to the advantages of the arrangement fed with D. C. as disclosed with reference to Fig. 1, the A. C. arrangement of Fig. 2 benefits in the present case by the fact that a suitable design of the relay 25 allows reducing to a value as low as may be desired the secondary voltage required for the transformer 27, which cuts out consequently the possibility of a dangerous voltage being applied to the welding tool at 18—19.

Figs. 3 to 5 illustrate a preferred embodiment of the welding tool. The wheel 30 made a carbon for instance is mounted in the case considered on an electrode-carrying member 31 assuming the shape illustrated, said member being pivotally secured at 32 to an intermediate member 33 into which is screwed the actual tool holder 34. The welding current is fed to the member 31 through the cable 35 passing through a bore provided for this purpose in the handle and extending in the shape of a bent passageway 36 provided in the intermediate member 33, the end of the cable being fastened by bolts onto an oblique bearing surface 37 provided on the member 31. A helical spring 38 is fitted between two cooperating arms 39 and 40 projecting respectively from the members 31 and 33 to hold them apart in the inoperative position illustrated in Fig. 3. Said arms 39 and 40 carry respectively, as shown in Fig. 5, the two auxiliary contact pieces 41 and 42 corresponding to the contact pieces 18—19 appearing in Figs. 1 and 2. The application of these two contact pieces against one another, which contact pieces are inserted in the circuit controlling the switch provided according to the invention, provides for the closing of the welding circuit.

With a tool thus executed, only the contact between the electrode and the part to be welded provides, as apparent and when sufficient pressure is exerted on the handle 34, for a movement of the arm 39 towards the arm 40 that engages the contact pieces 41 and 42 with one another and closes the welding circuit. The pressure required for making said circuit and holding it closed is defined in the present case by the gauging of the spring 38. The screw 43 serves as an abutment and limits the angular shifting of the arm 39 round the pivot 32 to the value just required for a proper engagement of the contact pieces 41 and 42.

As soon as the tool is no longer urged against the part to be welded with sufficient pressure, the return spring 38 provides for automatic opening of the contact pieces 41 and 42 and consequently, through the agency of the switch in the welding circuit, for the opening of the latter circuit, I obtain thus complete and automatic reliability in operation.

The arrangements disclosed may be used for all welding operations executed through resistance. They are of particular advantage for the welding of delicate and brittle parts. I may mention in this respect the possibility of welding metal gauze chiefly with a view to its repair which welding could not be obtained without any risk of damage according to the usual method whereas it may be obtained reliably and without any possible arcing through arrangements according to the present invention.

What I claim is:

1. In an electric resistance welding arrangement, a portable welding tool including a handle, an electrode, an electrode carrying member pivotally secured to said handle and adapted to enter a position in substantial alignment with the tool handle when operative, a spring urging the electrode carrier member into an oblique inoperative position with reference to the handle, and two cooperating contact pieces yieldingly carried by the electrode carrying member and by the handle respectively and adapted to engage one another operatively as soon as the electrode carrying member is urged into alignment with the handle.

2. In an electric resistance welding arrangement, a portable welding tool including an axially bored handle, an intermediate member rigid with the handle, an electrode carrier movably carried by said intermediate member, a contact piece carried by the last mentioned electrode carrier, a second contact piece carried by the intermediate member and elastic means urging the electrode carrier into a position corresponding to a spacing apart of the two contact pieces, and a yielding cable passing through the axial bore in the handle, connected with said electrode carrier and adapted to feed the welding current to said electrode carrier when the handle and intermediate member are urged against the electrode carrier, the two contact pieces being in operative contact.

3. In an electric resistance welding arrangement, a portable welding tool including an axially bored handle, an electrode, an electrode-carrying member pivotally secured to said handle and adapted to enter a position in substantial alignment with the tool handle when operative, a spring urging the electrode carrier member into an oblique inoperative position with reference to the handle, two cooperating contact pieces yieldingly carried by the electrode carrying member and by the handle respectively and adapted to engage one another operatively as soon as the electrode carrying member is urged into alignment with the handle, and a cable passing through the axial bore in the handle and connected with said electrode-carrying member, this cable being adapted to feed the welding current to said electrode-carrying member when said two contact pieces are in operative contact.

4. In an electric welding arrangement, a portable welding tool including an axially bored handle, an intermediate member rigid with the handle, an electrode carrying member pivotally secured to said handle and adapted to enter a position in substantial alignment with the tool handle when operative, a spring urging the electrode carrying member into an oblique inoperative position with reference to the handle, two cooperating contact pieces yieldingly carried by the electrode carrying member and by said intermediary member respectively and adapted to engage one another operatively when the electrode carrying member is urged into alignment with the handle, a welding wheel rotatably mounted in said electrode carrying member and electrically in contact therewith, and a cable passing through the axial bore of said handle and having its end fastened onto said electrode carrying member.

ADRIEN ALBARRANC.

References Cited in the file of this patent

UNITED STATES PATENTS

| Number | Name | Date |
| --- | --- | --- |
| 1,021,732 | Taylor | Mar. 26, 1912 |
| 2,183,908 | Gladitz | Dec. 19, 1939 |
| 2,397,646 | Brown | Apr. 2, 1946 |
| 2,454,338 | Pityo | Nov. 23, 1948 |

FOREIGN PATENTS

| Number | Country | Date |
| --- | --- | --- |
| 336,825 | Germany | Aug. 26, 1919 |